(12) United States Patent
Herbert

(10) Patent No.: US 9,668,609 B2
(45) Date of Patent: Jun. 6, 2017

(54) INDIVIDUAL FROZEN DRINK DISPENSER

(71) Applicant: Island Oasis Frozen Cocktail Co., Inc., Walpole, MA (US)

(72) Inventor: J. Michael Herbert, Winchester, MA (US)

(73) Assignee: Island Oasis Frozen Cocktail Co., Inc., Walpole, MA (US)

( * ) Notice: Subject to any disclaimer, the term of this patent is extended or adjusted under 35 U.S.C. 154(b) by 292 days.

(21) Appl. No.: 14/349,413

(22) PCT Filed: Oct. 4, 2012

(86) PCT No.: PCT/US2012/058642
§ 371 (c)(1),
(2) Date: Apr. 3, 2014

(87) PCT Pub. No.: WO2013/052596
PCT Pub. Date: Apr. 11, 2013

(65) Prior Publication Data
US 2014/0291426 A1    Oct. 2, 2014

Related U.S. Application Data

(60) Provisional application No. 61/543,588, filed on Oct. 5, 2011.

(51) Int. Cl.
*A47J 31/44* (2006.01)
*B67D 1/00* (2006.01)

(52) U.S. Cl.
CPC ........ *A47J 31/4403* (2013.01); *B67D 1/0004* (2013.01); *B67D 1/0021* (2013.01);
(Continued)

(58) Field of Classification Search
CPC .......... A23G 9/045; A23G 9/12; A23G 9/224; B67D 1/0053; B67D 1/0078
See application file for complete search history.

(56) References Cited

U.S. PATENT DOCUMENTS 3,209,676 A * 10/1965 Zimmermann ..... A47J 31/3657
206/0.5
3,213,777 A * 10/1965 Heier .................. A47J 31/3657
99/289 R
(Continued)

OTHER PUBLICATIONS

Notification of Transmittal of the International Search Report and the Written Opinion of the International Searching Authority from corresponding PCT/US2012/058642 mailed Jan. 4, 2013.

*Primary Examiner* — Tony G Soohoo
(74) *Attorney, Agent, or Firm* — Sughrue Mion, PLLC

(57) ABSTRACT

An individual frozen drink dispenser includes a bottom shelf configured to support a blender cup. The bottom shelf has a blender drive to drive the operation of blades provided in the blender cup. The dispenser further includes a dispensing chamber including a cartridge receptacle configured to receive a frozen beverage cartridge, and a dispense plunger. The dispenser further includes a water reservoir having a water pump to drive the movement of water from the water reservoir to the dispense plunger of the dispensing chamber and into the blender cup. A controller coupled to the blender drive, the dispenser plunger, and the water pump controls the operation of the individual frozen drink dispenser. Other embodiments of the dispenser and methods of dispensing frozen drinks are further disclosed.

19 Claims, 6 Drawing Sheets

(52) U.S. Cl.
CPC ......... *B67D 1/0043* (2013.01); *B67D 1/0053* (2013.01); *B67D 1/0078* (2013.01)

(56) References Cited

U.S. PATENT DOCUMENTS

| | | | | |
|---|---|---|---|---|
| 3,295,998 | A * | 1/1967 | Goros | A47J 31/3633 221/124 |
| 3,384,004 | A * | 5/1968 | Perlman | A47J 31/057 99/289 R |
| 3,647,472 | A * | 3/1972 | Speech | C12G 3/04 426/115 |
| 3,812,273 | A * | 5/1974 | Schmidt | A47J 31/3628 426/115 |
| 3,888,859 | A * | 6/1975 | Ponzoni | A23F 5/40 34/284 |
| 3,939,667 | A | 2/1976 | Halverson | |
| 4,163,510 | A | 8/1979 | Strenger | |
| 4,237,911 | A * | 12/1980 | White | A46B 5/04 132/329 |
| 4,467,943 | A | 8/1984 | Carse | |
| 4,528,824 | A | 7/1985 | Herbert | |
| 6,182,862 | B1 | 2/2001 | McGill | |
| 6,474,862 | B2 | 11/2002 | Farrell | |
| 7,231,142 | B1 * | 6/2007 | Leung | A47J 31/057 392/441 |
| 8,291,812 | B2 * | 10/2012 | Rivera | A47J 31/057 100/211 |
| 2002/0044997 | A1 | 4/2002 | Farrell | |
| 2005/0170054 | A1 | 8/2005 | Czark et al. | |
| 2008/0282722 | A1 * | 11/2008 | Edmonds | A23G 9/28 62/340 |
| 2013/0064034 | A1 * | 3/2013 | Almblad | A47J 43/046 366/205 |
| 2014/0291426 | A1 * | 10/2014 | Herbert | B67D 1/0004 241/25 |
| 2015/0071025 | A1 | 3/2015 | Herbert | |
| 2015/0296860 | A1 * | 10/2015 | DesJardin | A23N 1/02 426/489 |
| 2016/0095461 | A1 * | 4/2016 | Desjardin | A47J 19/02 99/513 |

* cited by examiner

INDIVIDUAL FROZEN DRINK DISPENSER

BACKGROUND OF THE INVENTION

1. Field of the Invention

This invention relates generally to beverage dispensers, and more particularly to a single serve frozen drink beverage dispenser capable of preparing a frozen beverage using a disposable cartridge containing frozen ingredients.

2. Description of the Prior Art

Single serve drink dispensers are known in the art for dispensing hot drinks, such as coffee and tea, and for dispensing cold drinks, such as carbonated beverages. However such dispensers are incapable of dispensing blended ice, frozen drinks, such as smoothies and the like.

There exists a need, therefore, for a dispenser that is designed to dispense frozen treats that has a relatively simple and inexpensive operating mechanism, with the capability of presenting a cartridge receptacle that is configured to receive a frozen cartridge containing the ingredients for the frozen treat, all within a sanitized environment.

SUMMARY OF THE INVENTION

One aspect of the present disclosure is directed to an individual frozen drink dispenser comprising: a bottom shelf configured to support a blender cup, the bottom shelf including a blender drive to drive the operation of blades provided in the blender cup; a dispensing chamber including a cartridge receptacle configured to receive a frozen beverage cartridge, and a dispense plunger; a water reservoir including a water pump to drive the movement of water from the water reservoir to the dispense plunger of the dispensing chamber and into the blender cup; and a controller coupled to the blender drive, the dispenser plunger, and the water pump to control the operation of the individual frozen drink dispenser.

Embodiments of the individual frozen drink dispenser may further include a meshed or serrated disc to separate frozen ingredients from the beverage cartridge into the blender cup. The dispense plunger may be configured to move from a pre-dispense position to a dispense position in which the dispense plunger pushes frozen ingredients from the beverage cartridge into the blender cup. The individual frozen drink dispenser may further comprise a dispense plunger drive motor to drive the movement of the dispense plunger from the pre-dispense position to the dispense position and a control panel coupled to the controller. The dispensing chamber may further include a water inlet coupled to the water reservoir and provided in the dispense plunger.

Another aspect of the present disclosure is directed to an individual frozen drink dispenser as shown and described.

Yet another aspect of the present disclosure is directed to a method of preparing a frozen drink as shown and describe.

Another aspect of the present disclosure is directed to an individual frozen drink dispenser includes a bottom shelf configured to support a blender cup. The bottom shelf has a blender drive to drive the operation of blades provided in the blender cup. The individual frozen drink dispenser further includes a dispensing chamber disposed above the bottom shelf. The dispensing chamber has a cartridge receptacle configured to receive a frozen beverage cartridge, a meshed or serrated disc disposed at a bottom of the cartridge receptacle, and a dispense plunger movable within the cartridge receptacle.

Embodiments of the individual frozen drink dispenser further include a controller coupled to the blender drive, the dispenser plunger, and the water pump to control the operation of the individual frozen drink dispenser. The individual frozen drink dispenser further may include a control panel coupled to the controller. The dispense plunger may be configured to move from a pre-dispense position to a dispense position in which the dispense plunger pushes frozen ingredients from the beverage cartridge, through the meshed or serrated disk, and into the blender cup. The individual frozen drink dispenser further may include a dispense plunger drive motor to drive the movement of the dispense plunger from the pre-dispense position to the dispense position. The individual frozen drink dispenser further may include a water reservoir having a water pump to drive the movement of water from the water reservoir to the dispense plunger of the dispensing chamber and into the blender cup. The dispensing chamber further may include a water inlet coupled to the water reservoir and provided in the dispense plunger.

Another aspect of the disclosure is directed to a method of dispensing a frozen drink comprising: inserting a frozen beverage cartridge into a cartridge receptacle of an individual frozen drink dispenser; pushing contents of the frozen beverage cartridge through a meshed or serrated disc positioned at a bottom of the cartridge receptacle; dispensing the contents of the frozen beverage cartridge from the meshed or serrated disc into a blender cup; and blending the contents of the frozen beverage cartridge in the blender cup with blades provided in the blender cup. In one embodiment, the method further may comprise injecting fluid from a water reservoir into the cartridge receptacle when pushing contents of the frozen cartridge.

These and other features and advantages of the present disclosure will now be described in greater detail with reference to the accompanying drawings, detailed description and claims.

DETAILED DESCRIPTION OF PREFERRED EMBODIMENTS

Figure 1:
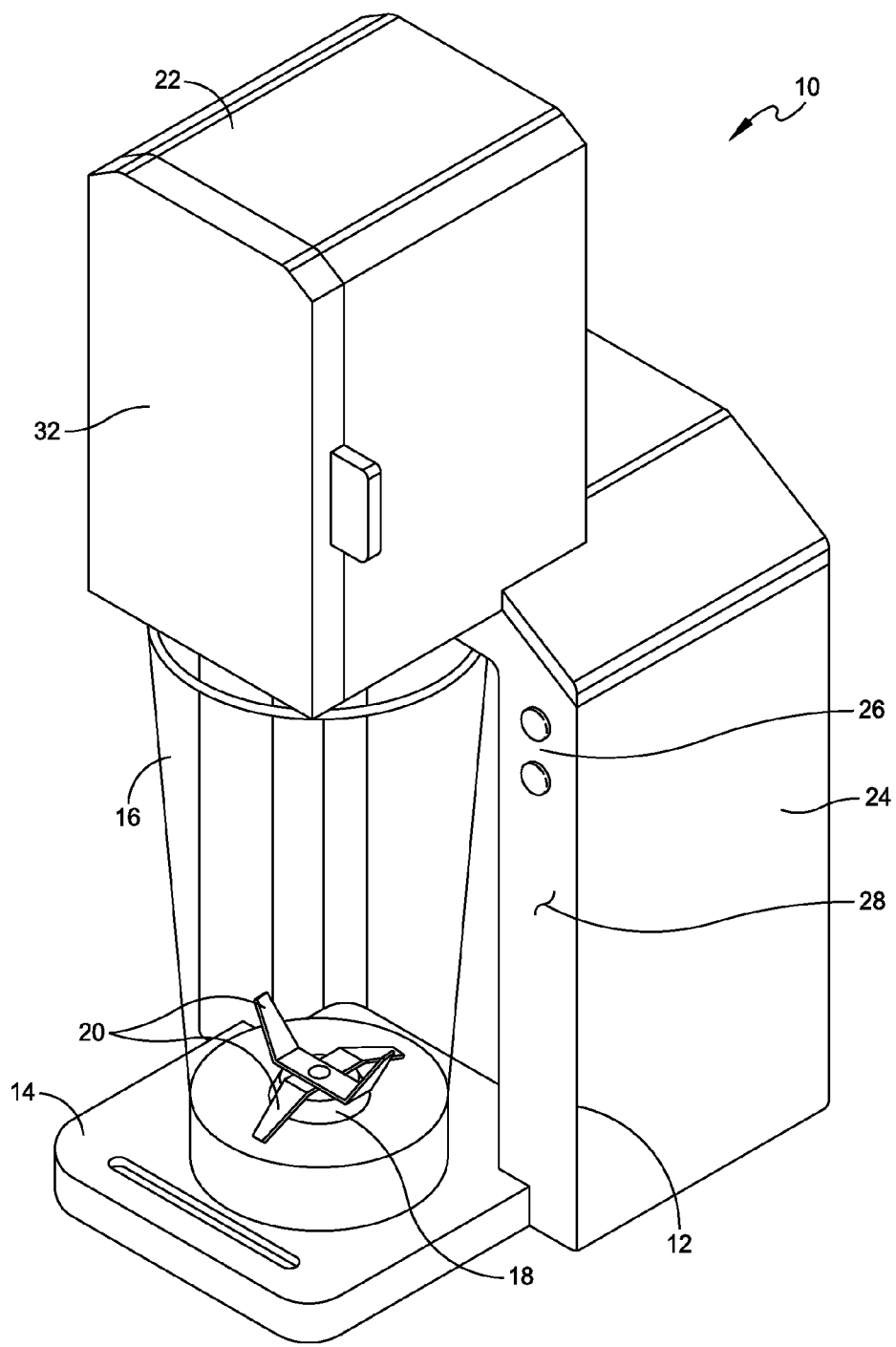
FIG. 1 is a perspective view of an individual frozen drink dispenser of an embodiment of the present disclosure.

For the purposes of illustration only, and not to limit the generality, the present invention will now be described in detail with reference to the accompanying figures. This invention is not limited in its application to the details of construction and the arrangement of components set forth in the following description or illustrated in the drawings. The invention is capable of other embodiments and of being practiced or being carried out in various ways. Also the phraseology and terminology used herein is for the purpose of description and should not be regarded as limiting. The use of "including," "comprising," "having," "containing" "involving," and variations thereof herein, is meant to encompass the items listed thereafter and equivalents thereof as well as additional items.

Referring to the drawings, and more particularly to FIG. 1, there is generally indicated at 10 a single serve or individual frozen drink dispenser. The dispenser 10 includes a housing 12 with a forwardly protruding bottom shelf 14 arranged to support a blender cup 16 for the dispensed frozen beverage. A blender drive 18 is provided on the bottom shelf 14 to drive the operation of blades 20 provided in the blender cup 16. The housing 12 further includes a dispensing chamber 22 positioned above the bottom shelf 14. The housing 12 further includes a water reservoir 24 positioned at the rear of the housing and an electronic control panel 26 provided on a front surface 28 of the housing to control the operation of the dispenser 10.

Figure 2:
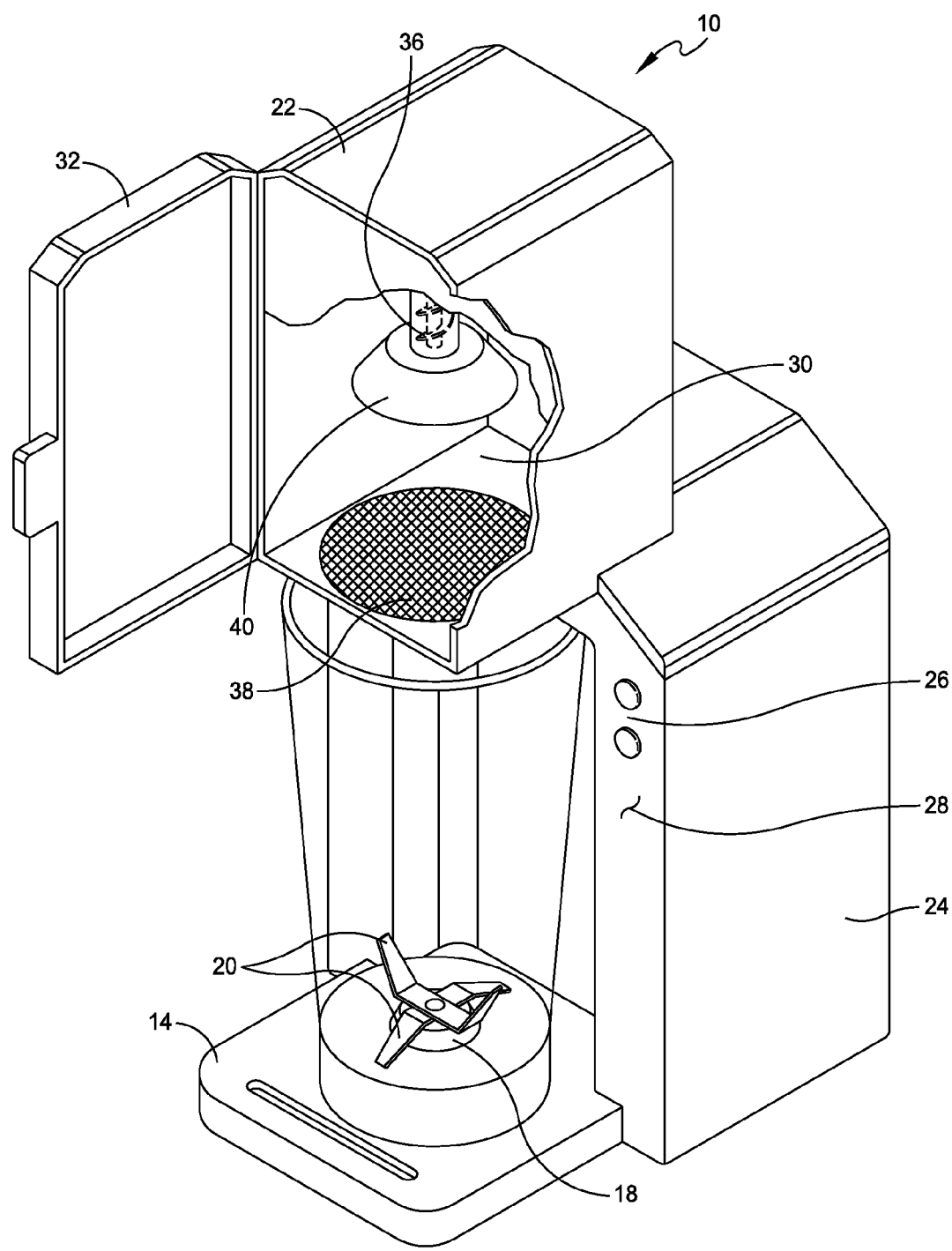
FIG. 2 is a perspective view of the frozen drink dispenser shown in FIG. 1 with a door of a dispensing chamber shown in an open position and part of the dispensing chamber removed to reveal a cartridge receptacle.

Referring to FIG. 2, the dispensing chamber 22 includes a cartridge receptacle 30 and a door 32 that provides access to the cartridge receptacle. The cartridge receptacle 30 is configured and dimensioned to receive a disposable, frozen beverage cartridge 34 (not shown in FIG. 2). The frozen beverage cartridge 34 will be shown and described with reference to FIGS. 3-5. The dispensing chamber 22 further includes a dispense plunger 36 that is controlled by the electronic control panel 26. The dispense plunger 36 drives the downward movement of ingredients contained within the frozen beverage cartridge 34 through a mesh or serrated disc 38 to separate the frozen ingredients being pushed through the disc. The mesh disc 38 may be fabricated from stainless steel material, or any other suitable material, that is capable of separating the frozen material. In an alternative embodiment, the serrated disc could be embedded within a serrated platform under the product to allow more efficient and timely blending.

In some embodiments, the frozen beverage cartridge 34 includes an impermeable container fabricated from cardboard or plastic material to contain frozen edible ingredients. In one embodiment, the frozen beverage cartridge 34 is cylindrical in shape. However, other suitable shapes that correspond to the shape of the dispense plunger 36. The frozen beverage cartridge 34 contains ingredients in liquid or non-frozen condition that are placed in a freezer for cooling. As used herein, a "cartridge" may take any suitable form depending on the size and form factor of the dispenser 10. The frozen beverage cartridge 34 may be impervious to air and/or liquid. The frozen beverage cartridge 34 may include edible frozen ingredients, such as fruit, milk, a drink mix, and/or any other suitable ingredient for creating a frozen beverage, such as a smoothie or the like. In preparing a frozen drink, such as a smoothie, the process of preparing a beverage may include infusion, mixing, dissolving or otherwise forming a drinkable substance using water or other beverage precursor (e.g., flavored or otherwise treated water, or other liquid) with the edible ingredient contained within the frozen beverage cartridge. Also, reference to "water" herein is to any suitable water formulation, e.g., filtered, de-ionized, softened, etc., as well as any other suitable precursor liquid used to form a frozen beverage, such as sweetened or flavored water, milk, etc.

Figure 3:
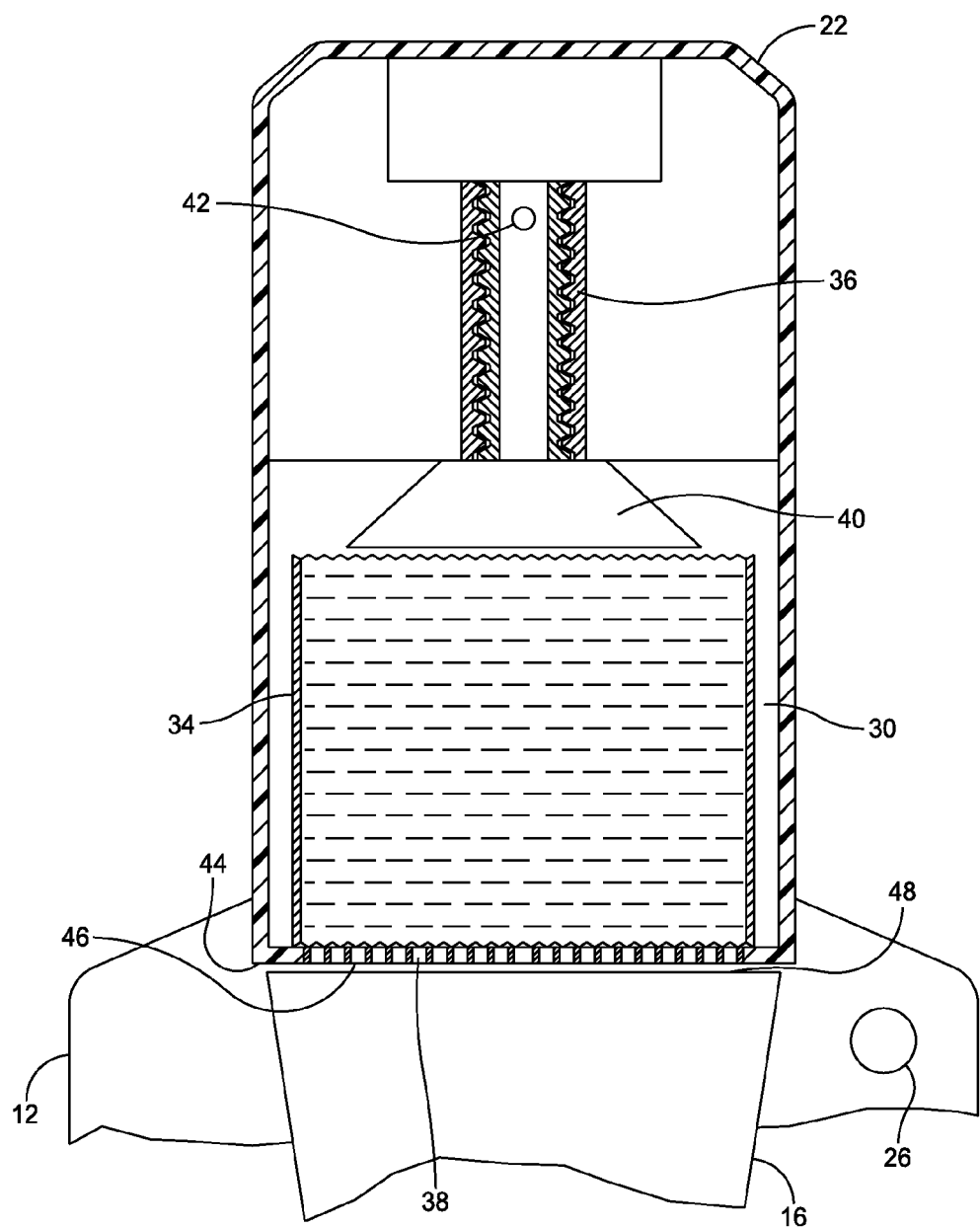
FIG. 3 is a cross-sectional view of the dispensing chamber of the frozen drink dispenser with a dispense plunger of the dispensing chamber being shown in a pre-dispense or upper position.
Figure 4:
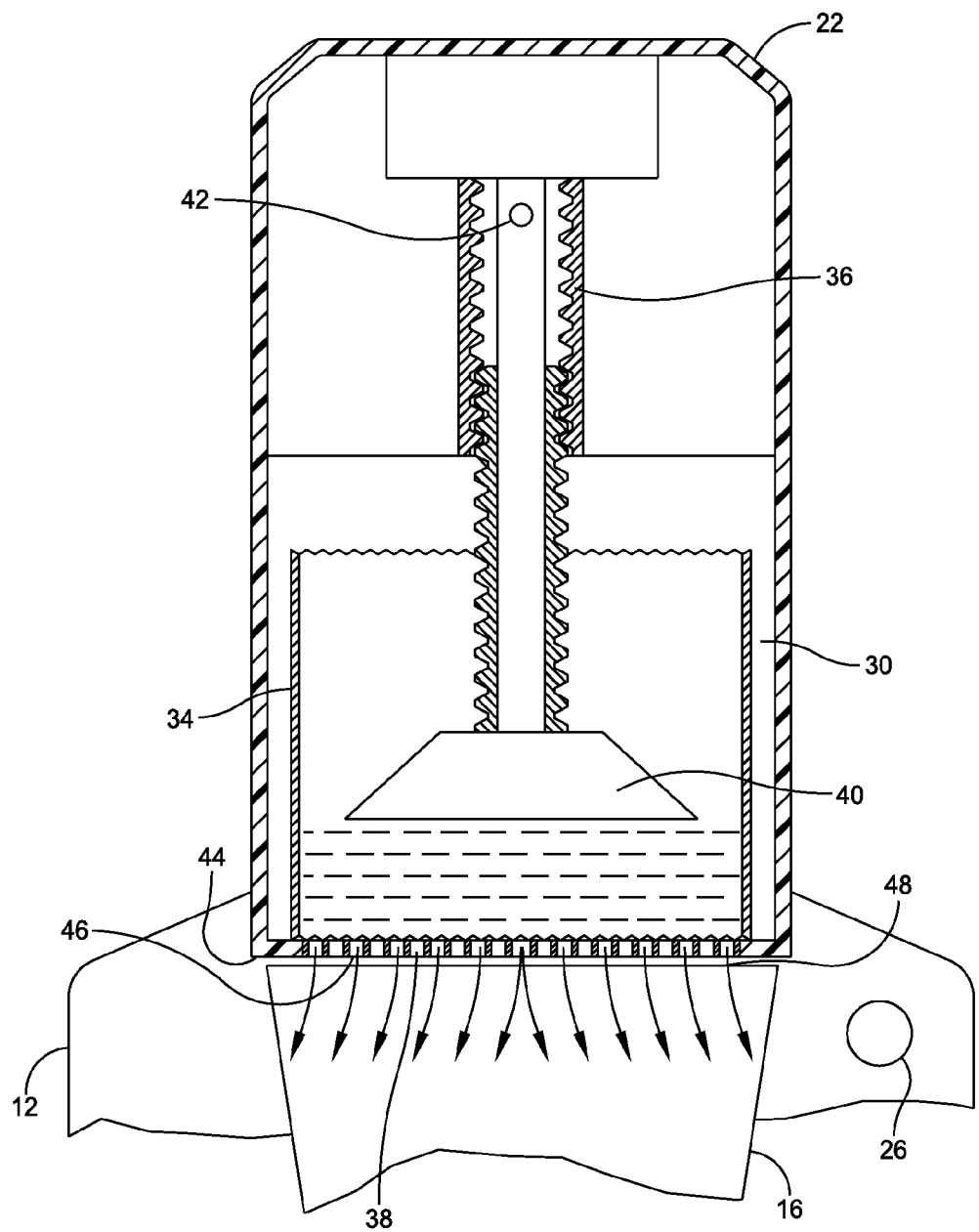
FIG. 4 is a cross-sectional view of the dispensing chamber of the frozen drink dispenser with the dispense plunger being shown in a dispense or lower position.
Figure 5:
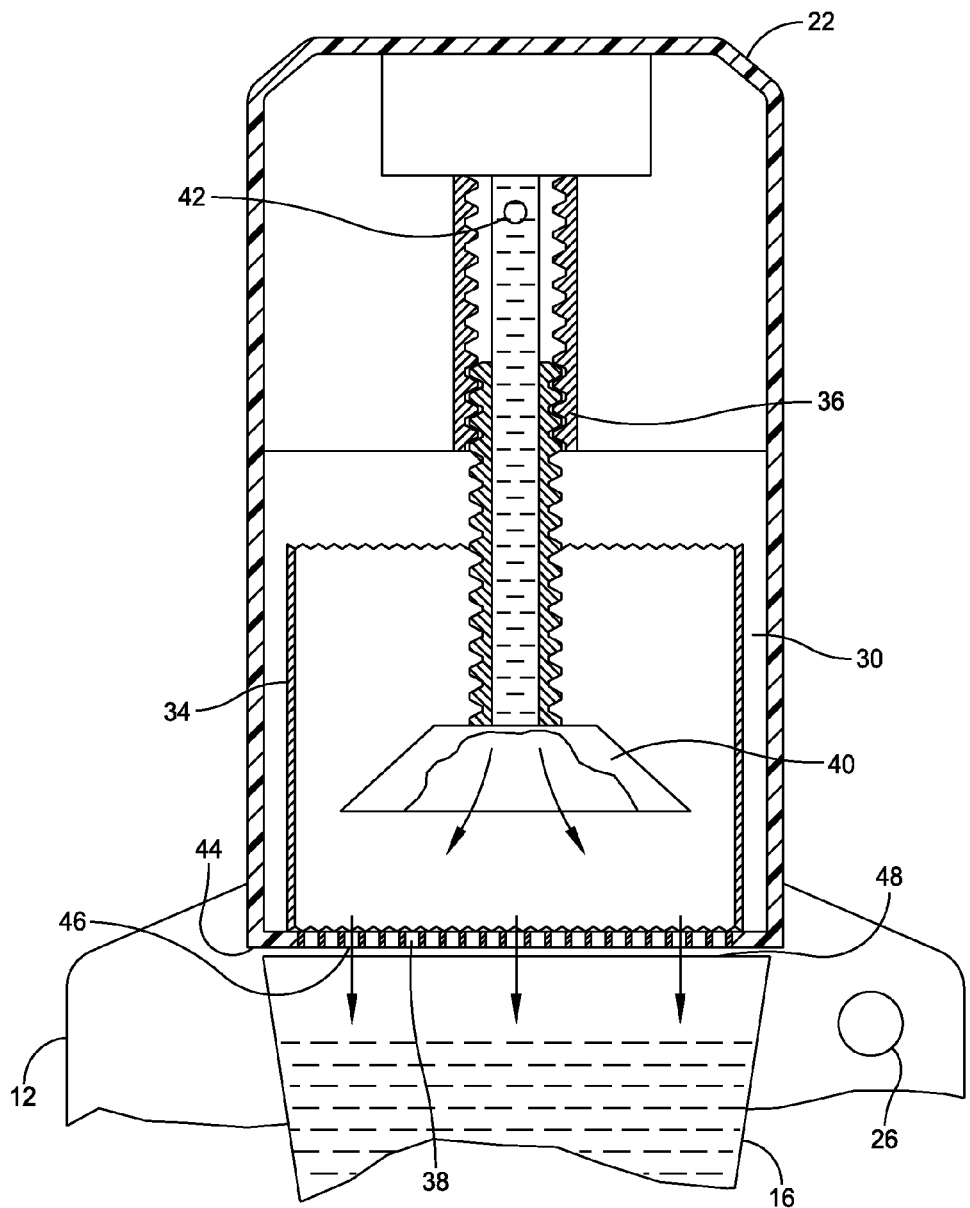
FIG. 5 is a cross-sectional view similar to FIG. 4 showing a fluid (e.g., water) being dispensed through the dispense plunger.

Referring to FIGS. 3-5, the dispensing chamber 22, in addition to the dispense plunger 36, includes a cover 40 that is disposed over the dispense plunger to prevent the ingredients from exiting up through the frozen beverage cartridge 34 as the dispense plunger moves downward through the frozen beverage cartridge. The cover 40 assists in maintaining the cartridge receptacle 30 in a sanitized condition while operating the dispense plunger 36. The dispensing chamber 22 further includes a water inlet 42 for introducing measured pumped water into the dispense plunger 36 from the water reservoir 24. Thus, the water is introduced into the blender cup 16 via the dispense plunger 36. The water is used to prepare the frozen beverage and to rinse the dispense plunger 36 and the disc 38.

Referring to FIG. 3, the dispense plunger 36 is shown in a pre-dispense or upper position. In this position, the frozen beverage cartridge 34 may be inserted into the cartridge receptacle 30 with the dispense plunger and the cover 40 disposed above the frozen beverage cartridge.

Referring to FIG. 4, the dispense plunger 36 is shown in a dispense or substantially lower position. In this position, the dispense plunger 36 is moved into the frozen beverage cartridge 34 to push the ingredients contained within the frozen beverage cartridge through the disc 38 and into the blender cup 16.

Referring to FIG. 5, the dispense plunger 36 is further shown in the dispense position with water or another suitable fluid being dispensed through the dispense plunger from the water inlet 42 through the disc 38 and into the blender cup 16. Once the blender cup 16 is filled with the edible ingredients and water, the blender drive 18 is operated to rotate the blades 20 provided in the blender cup. This operation mixes the ingredients within the blender cup 16 to create the finished drink, e.g., the smoothie. As shown, a bottom edge 44 of the dispensing chamber 22 and a bottom surface 46 of the disc 38 are closely proximate to a top edge 48 of the blender cup 16 to prevent the ingredients and water from splashing out of the blender cup.

Figure 6:
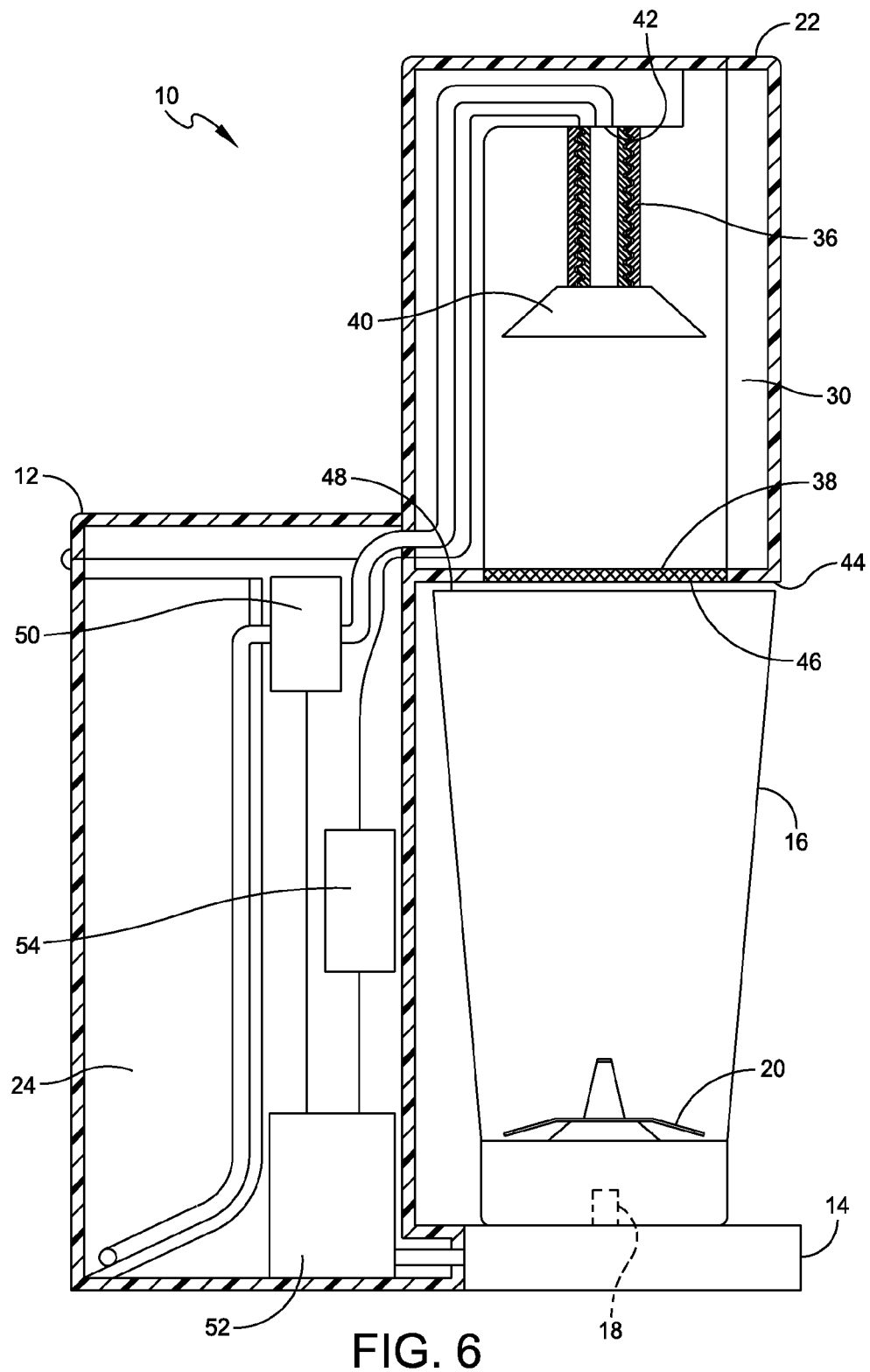
FIG. 6 is a cross-sectional side view of the frozen drink dispenser.

FIG. 6 illustrates other components of the dispenser 10. As shown, the water reservoir 24 is connected to a water pump 50, which drives the movement of the water from the water reservoir to the dispense plunger 36. The dispenser 10 further includes an electronic control box or controller 52 that is coupled to the water pump 50, the blender drive 18, and to the electronic control panel 26. The electronic control box 52 is further coupled to a drive motor 54 to drive the up-and-down movement of the dispense plunger 36, and to the blender drive 18 to rotate the blades 20 of the blender cup. The electronic control box 52, via the electronic control panel 26, controls the operation of these component parts of the dispenser 10.

In light of the foregoing, it will now be understood that the dispenser 10 of the present disclosure is capable of preparing an individual frozen drink from a disposable frozen beverage cartridge 34 containing the necessary ingredients for preparing the frozen drink. In operation, the door 32 of the dispensing chamber 22 is opened and a new frozen cartridge 34 is inserted into the cartridge receptacle 30. Once inserted, the door 32 is closed and the dispense plunger 36 is driven downwardly to expel the frozen ingredients from the frozen beverage cartridge 34 through the disc 38 and into the blender cup 16. Once fully expelled, a pre-measured amount of water is delivered to the blender cup 16 from the water reservoir 24 by operating the water pump 50. This part of the process also rinses the dispense plunger 36 and the disc 38 so as to maintain a clean environment. Once the frozen ingredients and the water are disposed in the blender cup 16, the blender drive 18 is operated to rotate the blades 20. This action blends or mixes the frozen ingredients and the water to create the frozen drink that is suitable for consumption. Once the frozen drink is prepared, the door 32 to the dispensing chamber 22 may be opened to remove the depleted cartridge 34. At this point the process of preparing another frozen beverage may begin again.

A method of dispensing a frozen drink can be achieved by using the dispenser 10 of embodiments of the present disclosure. For example, the method may include inserting a frozen beverage cartridge 34 into the cartridge receptacle 30 of the individual frozen drink dispenser 10. Next, the contents of the frozen beverage cartridge 34 are pushed through the meshed or serrated disc 38 positioned at a bottom of the cartridge receptacle 30. Next, the contents of the frozen beverage cartridge 34 are dispensed from the meshed or serrated disc 38 into the blender cup 16. Next, the contents of the frozen beverage cartridge dispensed in the blender cup 16 are blended with blades 20 provided in the blender cup. Optionally, when pushing the contents of the frozen beverage cartridge 34 through the meshed or serrated disc 38, the method further may include injecting fluid from the water reservoir 24 into the cartridge receptacle 30 when pushing contents of the frozen cartridge to add flavor, for example, to the contents being pushed through the meshed or serrated disc.

Having thus described at least one embodiment of the present disclosure, various alternations, modifications and improvements will readily occur to those skilled in the art. Such alterations, modifications and improvements are intended to be within the scope and spirit of the disclosure. Accordingly, the foregoing description is by way of example only and is not intended to be limiting. The disclosure's limit is defined only in the following claims and equivalents thereto.

What is claimed is:

1. An individual frozen drink dispenser comprising:
   a bottom shelf configured to support a blender cup, the bottom shelf including a blender drive to drive operation of blades provided in the blender cup;
   a dispensing chamber including a cartridge receptacle configured to receive a frozen beverage cartridge, and a dispense plunger comprising a conduit connected to a fluid source and through which fluid is dispensed into to the blend cup for making a frozen drink; and
   a controller coupled to the blender drive, the dispenser plunger, and a water pump to control the operation of the individual frozen drink dispenser.

2. The individual frozen drink dispenser of claim 1, wherein the dispensing chamber further includes a meshed or serrated disc to separate frozen ingredients from the beverage cartridge into the blender cup.

3. The individual frozen drink dispenser of claim 2, wherein the dispense plunger is configured to move from a pre-dispense position to a dispense position in which the dispense plunger pushes frozen ingredients from the beverage cartridge into the blender cup.

4. The individual frozen drink dispenser of claim 3, further comprising a dispense plunger drive motor to drive the movement of the dispense plunger from the pre-dispense position to the dispense position.

5. The individual frozen drink dispenser of claim 1, further comprising a control panel coupled to the controller.

6. The individual frozen drink dispenser of claim 1, further comprising a water reservoir including the water pump to drive the movement of water from the water reservoir to the dispense plunger of the dispensing chamber and into the blender cup.

7. The individual frozen drink dispenser of claim 6, wherein the dispensing chamber further includes a water inlet coupled to the water reservoir and provided in the dispense plunger.

8. An individual frozen drink dispenser comprising:
   a bottom shelf configured to support a blender cup, the bottom shelf having a blender drive to drive the operation of blades provided in the blender cup; and
   a dispensing chamber disposed above the bottom shelf, the dispensing chamber having a cartridge receptacle configured to receive a frozen beverage cartridge, a meshed or serrated disc disposed at a bottom of the cartridge receptacle, and a dispense plunger movable within the cartridge receptacle, the dispense plunger comprising a conduit connected to a fluid source and through which fluid is dispensed into to the blend cup for making a frozen drink.

9. The individual frozen drink dispenser of claim 8, further including a controller coupled to the blender drive, the dispenser plunger, and a water pump to control the operation of the individual frozen drink dispenser.

10. The individual frozen drink dispenser of claim 9, further comprising a control panel coupled to the controller.

11. The individual frozen drink dispenser of claim 8, wherein the dispense plunger is configured to move from a pre-dispense position to a dispense position in which the dispense plunger pushes frozen ingredients from the beverage cartridge, through the meshed or serrated disk, and into the blender cup.

12. The individual frozen drink dispenser of claim 11, further comprising a dispense plunger drive motor to drive the movement of the dispense plunger from the pre-dispense position to the dispense position.

13. The individual frozen drink dispenser of claim 8, further comprising a water reservoir having a water pump to drive the movement of water from the water reservoir to the dispense plunger of the dispensing chamber and into the blender cup.

14. The individual frozen drink dispenser of claim 8, wherein the dispensing chamber further includes a water inlet coupled to the water reservoir and provided in the dispense plunger.

15. A method of dispensing a frozen drink, the method comprising:
   inserting a frozen beverage cartridge into a cartridge receptacle of an individual frozen drink dispenser;
   pushing contents of the frozen beverage cartridge through a meshed or serrated disc positioned at a bottom of the cartridge receptacle;
   dispensing the contents of the frozen beverage cartridge from the meshed or serrated disc into a blender cup; and
   blending the contents of the frozen beverage cartridge in the blender cup with blades provided in the blender cup.

16. The method of claim 15, further comprising injecting fluid from a water reservoir into the cartridge receptacle when pushing contents of the frozen beverage cartridge.

17. The method of claim 15, wherein the frozen beverage cartridge comprises frozen solids.

18. An individual frozen drink dispenser comprising:
   a frozen beverage cartridge comprising frozen edible ingredients;
   a blender cup comprising rotatable blades;
   a bottom shelf configured to support the blender cup, the bottom shelf having a blender drive to drive rotation of the blades;

a dispensing chamber disposed above the blender cup when seated on the bottom shelf, the dispensing chamber comprising a cartridge receptacle containing the frozen beverage cartridge; and a driver that dispenses contents of the frozen beverage cartridge, including the frozen edible ingredients, into the blender cup.

19. A method of dispensing a frozen drink, the method comprising:

providing a frozen drink dispenser comprising:
- a frozen beverage cartridge comprising frozen edible ingredients;
- a blender cup comprising rotatable blades; and
- a bottom shelf supporting the blender cup, the bottom shelf having a blender drive to drive rotation of the blades;
- a dispensing chamber disposed above the blender cup and comprising a cartridge receptacle; and
- a driver that dispenses contents of the frozen beverage cartridge, including the frozen edible ingredients, into the blender cup;

inserting the frozen beverage cartridge into the cartridge receptacle;

dispensing the contents of the frozen beverage cartridge, using the driver, into the blender cup; and blending the contents of the frozen beverage cartridge in the blender cup with the blades provided in the blender cup.

* * * * *